US007234845B2

(12) United States Patent
Ishino et al.

(10) Patent No.: US 7,234,845 B2
(45) Date of Patent: Jun. 26, 2007

(54) REFLECTOR FOR AN ELECTRONIC FLASH DEVICE AND ELECTRONIC FLASH DEVICE

(75) Inventors: Satoru Ishino, Aichi (JP); Makoto Iwase, Aichi (JP); Takumi Matsuo, Kanagawa (JP)

(73) Assignee: Sony Corporation and Shibakawa Manufacturing Co., Ltd. (JP)

( * ) Notice: Subject to any disclaimer, the term of this patent is extended or adjusted under 35 U.S.C. 154(b) by 70 days.

(21) Appl. No.: 10/533,903

(22) PCT Filed: Nov. 12, 2003

(86) PCT No.: PCT/JP03/14378

§ 371 (c)(1),
(2), (4) Date: May 5, 2005

(87) PCT Pub. No.: WO2004/046808

PCT Pub. Date: Jun. 3, 2004

(65) Prior Publication Data

US 2006/0028824 A1    Feb. 9, 2006

(30) Foreign Application Priority Data

Nov. 13, 2002  (JP) ............................. 2002-329852
May 28, 2003  (JP) ............................. 2003-151190

(51) Int. Cl.
*F21V 7/00*    (2006.01)

(52) U.S. Cl. ...................... 362/297; 362/346

(58) Field of Classification Search ........ 362/296–298, 362/350, 346–347, 341; 396/200; 359/868–869
See application file for complete search history.

(56) References Cited

U.S. PATENT DOCUMENTS 3,152,765 A * 10/1964 Wohlers ..................... 362/217
5,641,218 A *  6/1997 Sakurai ....................... 362/16
2003/0007359 A1* 1/2003 Sugawara et al. .......... 362/326

FOREIGN PATENT DOCUMENTS

JP           01-265401        10/1989

(Continued)

OTHER PUBLICATIONS

International Search Report mailed Mar. 30, 2004.

*Primary Examiner*—Renee Luebke
*Assistant Examiner*—Robert May
(74) *Attorney, Agent, or Firm*—Rader Fishman & Grauer PLLC; Ronald P. Kananen

(57) ABSTRACT

A reflector used in an electronic flash device that collectively emits direct light emitted from a light source and reflected light that has been reflected by a reflective surface onto a subject, and an electronic flash device that uses such reflector. The reflector includes a pair of first reflective surfaces that are composed of portions of a cylindrical curved surface and face one another, and a second reflective surface that is contiguous with the pair of first reflective surfaces and inside which a xenon lamp is housed. Contiguous portions where the pair of first reflective surfaces and the second reflective surface are contiguous are set closer to the opening of the pair of first reflective surfaces than a center of the xenon lamp. With this construction, by it is possible to maintain a predetermined optical performance while making the electronic flash device smaller and slimmer.

16 Claims, 9 Drawing Sheets

FOREIGN PATENT DOCUMENTS

| | | |
|---|---|---|
| JP | 05-232553 | 9/1993 |
| JP | 05-257194 | 10/1993 |
| JP | 06-118485 | 4/1994 |
| JP | 07-110513 | 4/1995 |
| JP | 09-166815 | 6/1997 |
| JP | 09-197497 | 7/1997 |
| JP | 10-062846 | 3/1998 |
| JP | 2000-180923 | 6/2000 |
| JP | 2001-133857 | 5/2001 |

* cited by examiner

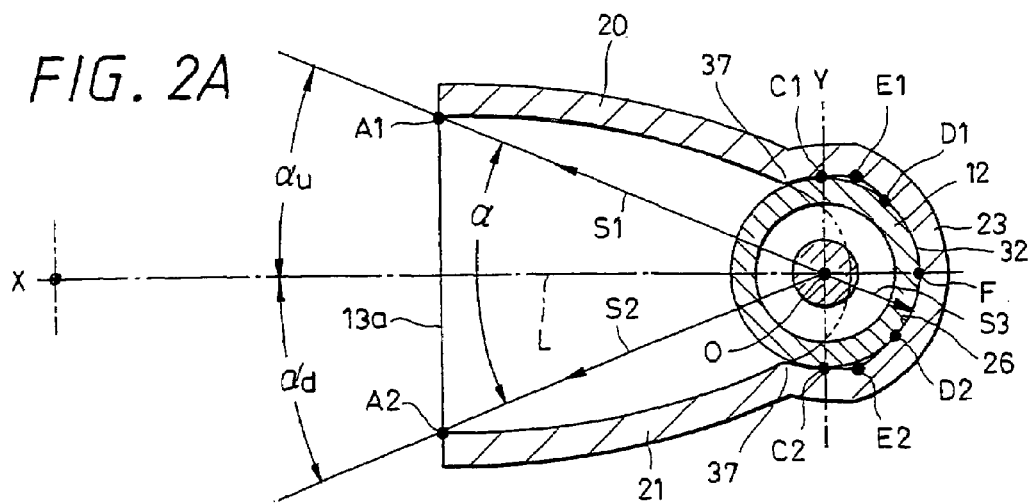
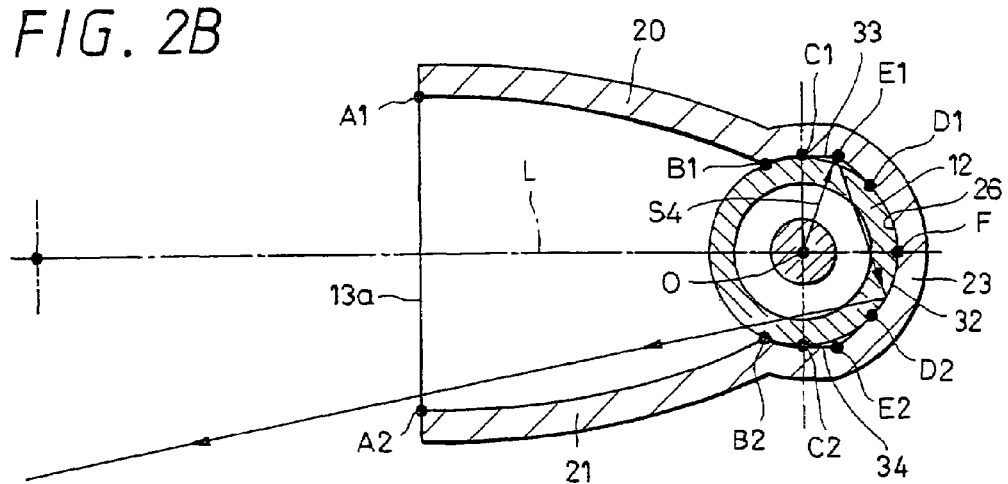
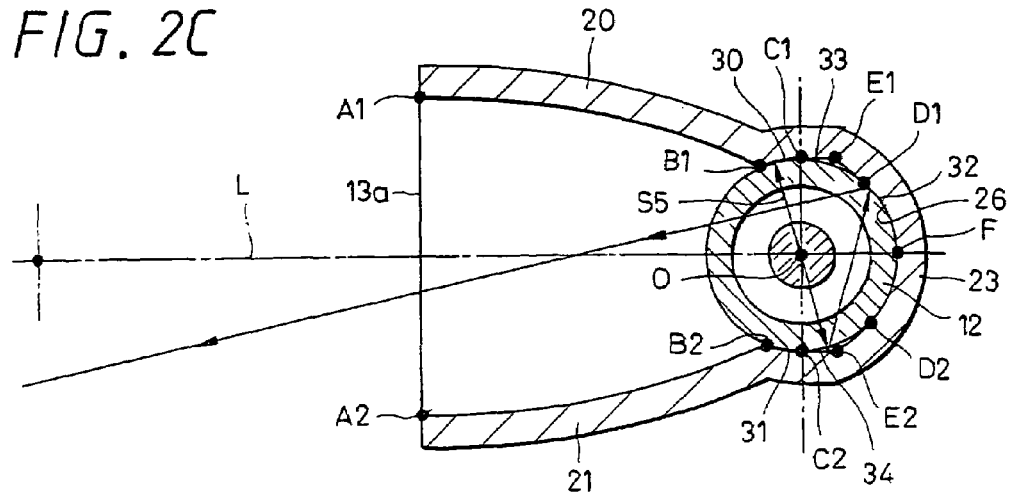

US 7,234,845 B2

REFLECTOR FOR AN ELECTRONIC FLASH DEVICE AND ELECTRONIC FLASH DEVICE

TECHNICAL FIELD

The present invention relates to a reflector used in an electronic flash device where direct light emitted from a light source and reflected light that has been reflected by a reflective surface are collectively irradiated onto a subject and to an electronic flash device in which the reflector is used.

BACKGROUND ART

One example of a conventional reflector for an electronic flash device is shown in FIG. 12 (see, for example, Patent Document 1). This reflector 1 includes a light source housing portion 3 that houses a light source 2 in an inside portion thereof, and an upper surface portion 4 and lower surface portion 5 that are contiguously formed on both sides in a direction that is perpendicular to a longitudinal direction of the light source housing 3. The light source housing portion 3 includes a cylindrical surface portion that is cylindrical and is formed with a center O of the housed light source 2 as a center of the radius of curvature, with an inner surface of the cylindrical surface portion as a second reflective surface 3a. Respective inner surfaces of the upper surface portion 4 and the lower surface portion 5 are first reflective surfaces 4a and 5a. These first reflective surfaces 4a and 5a are formed so as to be symmetrical in the up-down direction about a center plane L of the upper surface portion 4 and the lower surface portion 5 that form an upper/lower pair.

An imaginary plane 7 including contiguous portions 6, 6 where the light source housing portion 3 of the reflector 1 and the upper and lower surface portions 4 and 5 are contiguous is set so as to be displaced toward the rear surface (i.e., on an opposite side to an opening 8 of the reflector 1) by a distance M from the center O of the light source 2. According to this reflector 1, light N outputted from the light source 2 is emitted to the front from an opening 8 with a light distribution angle α (for example, 45°).

Another example of an electronic flash device is disclosed in Patent Document 2. Patent Document 2 discloses a lamp-integrated front grill that is disposed between headlamps that are disposed on the left and right of the front of a vehicle, the front grill enclosing lamps and thereby making it possible to reduce the number of parts and to reduce the number of assembly and attachment steps.

This lamp-integrated front grill is a lamp-integrated front grill disposed between the headlamps disposed on the left and right of the front of a vehicle, is wide in the left-right direction, and includes reflective concave portions that are open to a front surface at both left and right end portions thereof. The lamp-integrated front grill includes a body whose inner surfaces are reflective surfaces, lenses attached to the body so as to cover a front surface thereof, and light bulbs attached to the concave portions of the body. The body is formed so that at portions aside from the reflective concave portions, the lower portions are wide compared to the upper portions. Lens steps are formed across the entire lenses, and the edges of the openings of the reflective concave portions are positioned so as to not block light directly emitted from the light source portions of the lamps to end portions of the lenses.

Patent Document 1
  Japanese Laid-Open Patent Publication No. H05-257194 (see Page 2 and FIG. 5)

Patent Document 2
  Japanese Laid-Open Patent Publication No. H01-265401 (see Pages 2 and 3, and FIG. 4)

However, for the reflectors of the electronic flash devices described above, and in particular, for the reflector of Patent Document 1, the size of the opening 8 of the pair of the first reflective surfaces 4a and 5a is wide and the light distribution angle α is not considered, so that to direct the emitted direct light from the opening 8 within a predetermined light distribution angle, the reflector has to be long in the depth direction. This has resulted in the problem that electronic flash devices cannot be made slim or miniaturized. Also, although the light distribution angle can be narrowed using a protector, there is a limit on doing so, and since light is emitted outside the light distribution angle, there is also the problem that the radiation efficiency is poor. In addition, since reflected light cannot be used effectively with conventional reflectors, it has been difficult to reduce the size of the opening while maintaining a predetermined optical performance. Also, although conventional reflectors with small openings do exist, in such cases it is necessary to use a special aspherical lens as the protector and an integrated construction, resulting in the problems of such reflectors having a complex construction and being costly.

The present invention was conceived to solve the above problems with the conventional art and it is an object of the present invention to provide a reflector for an electronic flash device, as well as an electronic flash device that uses the reflector, where the shape of the second reflective surface or the like that reflects light emitted from the light source to the rear is adjusted to emit all or a majority of the reflected light from an opening to the front with a predetermined light distribution angle, so that a slim and/or miniaturized construction can be used while maintaining a predetermined optical performance.

DISCLOSURE OF THE INVENTION

To solve the stated problem and achieve the stated object, a reflector for an electronic flash device according to the present invention includes a pair of first reflective surfaces that are composed of portions of a cylindrical curved surface and face one another and a second reflective surface that is contiguous with the pair of first reflective surfaces and in an inside portion of which a light source is housed, wherein contiguous portions where the pair of first reflective surfaces and the second reflective surface are contiguous are set closer to an opening of the pair of first reflective surfaces than a center portion of the housed light source.

Also, an electronic flash device according to the present invention includes a light source and a reflector that reflects light emitted from the light source on a reflective surface thereof, wherein the reflector includes a pair of first reflective surfaces that form part of a cylindrical curved surface and face one another and a second reflective surface that is contiguous with said pair of first reflective surfaces and in an inside portion of which the light source is housed, and contiguous portions where said pair of first reflective surfaces and said second reflective surface are contiguous are set closer to an opening in said pair of first reflective surfaces than a center portion of the housed light source.

According to the reflector for an electronic flash device according to the present invention, by setting the contiguous portions where the pair of first reflective surfaces and the second reflective surface are contiguous closer to an opening of the pair of first reflective surfaces than a center portion of the light source housed in the second reflective surface, it is possible to emit all or the majority of the reflected light to the front from the opening with a predetermined light distribution angle, so that it is possible to maintain a predetermined optical performance while making the electronic flash device smaller and slimmer. In addition, using the second reflective surface, light outputted from the light source is reflected one or more times to increase the amount of light directed to the front and thereby efficiently emit light, with it also being possible to easily and reliably adjust the light distribution angle for the light emitted from the light source.

According to the electronic flash device according to the present invention, by providing the pair of first reflective surfaces and the second reflective surface on the reflector that reflects light emitted from the light source and setting the contiguous portions where the pair of first reflective surfaces and the second reflective surface are contiguous toward to an opening from a center portion of the light source, it is possible to emit all or the majority of the reflected light to the front from the opening, so that it is possible to maintain a predetermined optical performance while making the electronic flash device smaller and slimmer. In addition, using the second reflective surface, light outputted from the light source is reflected one or more times to increase the amount of light directed to the front and thereby efficiently emit light, with it also being possible to easily and reliably adjust the light distribution angle for the light emitted from the light source.

BRIEF DESCRIPTION OF DRAWINGS

FIG. 2A is a diagram useful for explaining optical paths of the reflector for an electronic flash device according to the first embodiment shown in FIG. 1, and shows a state where light is directly emitted to the front.

FIG. 2B is a diagram useful in explaining the optical paths of the same reflector for an electronic flash device, and shows a state where light is primarily reflected by parallel flat surfaces.

FIG. 2C is a diagram useful in explaining the optical paths of the same reflector for an electronic flash device, and shows a state where light is primarily reflected by front cylindrical surfaces.

BEST MODE FOR CARRYING OUT THE INVENTION

Embodiments of a reflector for an electronic flash device and an electronic flash device including the reflector according to the present invention will be explained hereinafter with reference to the attached drawings.

Figure 8:
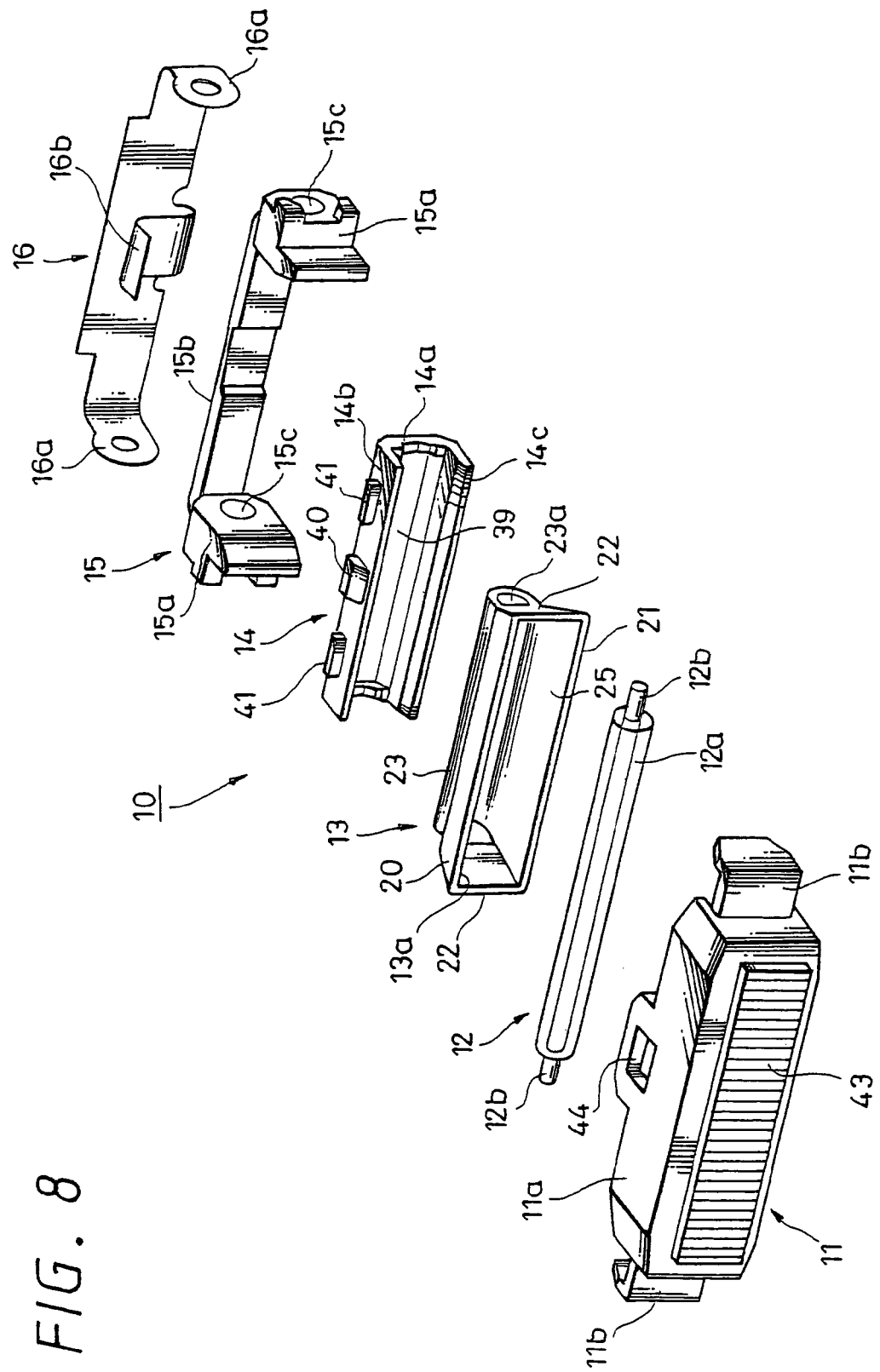
FIG. 8 is an exploded perspective view of one embodiment of an electronic flash device including the first embodiment of a reflector for an electronic flash device according to the present invention.

First, the electronic flash device will be described. As shown in FIG. 8, the electronic flash device 10 according to the present invention includes a protector 11, a xenon lamp 12 as a light source, a reflector 13, a holder 14, a shield rubber 15, and a flexible printed circuit board (hereinafter "flexible PCB") 16.

As shown in FIG. 8, the reflector 13 is constructed of a pair of an upper surface portion 20 and a lower surface portion 21 composed of portion of a substantially cylindrical curved surface that face each other above and below, a pair of side surface portions 22, 22 that face each other on the left and right, and a light source housing portion 23 that is contiguous with rear surface sides of such portions. The upper and lower surface portions 20, 21 and the left and right side surface portions 22, 22 have cross-sectional forms that narrow toward the rear surface sides thereof and widen on the opening 13a sides somewhat like a horn, with the light source housing portion 23 being integrally provided so as to close such rear surface sides.

Figure 1:
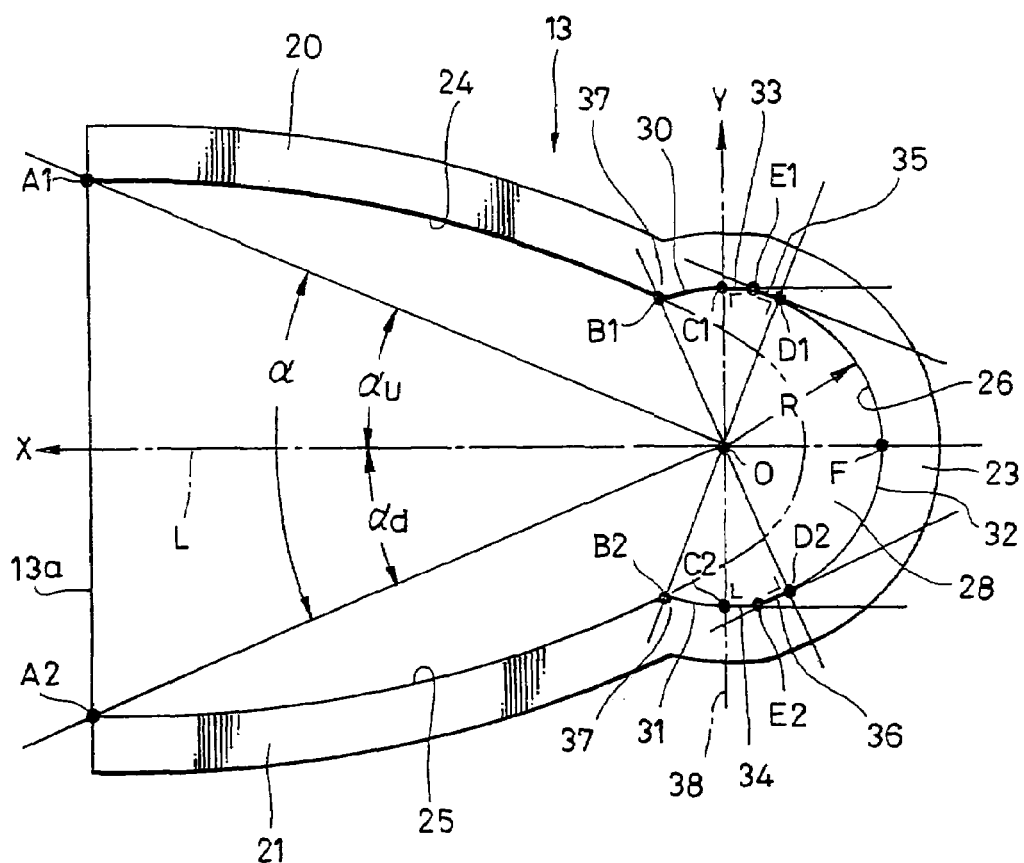
FIG. 1 is a diagram useful for explaining the cross-sectional form of a first embodiment of a reflector for an electronic flash device according to the present invention.

As shown in FIG. 1, the upper and lower surface portions 20, 21 and the light source housing portion 23 are formed so as to be symmetrical in an up-down direction about a central plane L. Respective inner surfaces of the upper and lower surface portions 20, 21 compose a pair of first reflective surfaces 24, 25 that face one another in the up-down direction and an inner surface of the light source housing portion 23 composes a second reflective surface 26. This pair of first reflective surfaces 24, 25, the second reflective surface 26, and third reflective surfaces that are inner surfaces of the pair of side surface portions 22, 22 are formed by mirror finishing, for example, so that light can be favorably reflected.

The first reflective surfaces 24, 25 are respectively formed with shapes that are portions of a cylindrical curved surface that has an overall substantially cylindrical shape. However, the cross-sectional forms of the first reflective surfaces 24, 25 are not limited to this embodiment, and it is possible to use a circular form, an oval form, a parabola, a quadratic curve, a cubic curve, or other type of curved surface. The right and left side surface portions 22, 22 may be curved surfaces with radii of curvature of an appropriate size, or may be flat surfaces that are inclined at an appropriate angle.

Holes 23a with a similar shape to the second reflective surface 26 are formed in both side surfaces of the light source housing portion 23 (see FIG. 8). By inserting and removing the xenon lamp 12 through the holes 23a, the xenon lamp 12 is detachably provided in a center hole 28 that is provided at the center O of the light source housing portion 23 and whose inner surface composes the second reflective surface. The inner diameter of the center hole 28 is set substantially equal to the outer diameter of the xenon lamp 12 so that the xenon lamp 12 is engaged by the center hole 28 with very little rattling. By doing so, over 180° of the circumference of the xenon lamp 12 that is the light source is surrounded by the second reflective surface 26.

In addition, constricting portions 37, 37 that form a gap that is narrower than double a radius of curvature forming the second reflective surface 26 are formed between contiguous portions B1, B2 where the first reflective surfaces 24, 25 and the second reflective surface 26 are contiguous so as to intersect.

The second reflective surface 26 that is the inner surface of the center hole 28 differs to the first reflective surfaces 24, 25 by being non-cylindrical by including flat surface portions within a cylindrical circular surface portion that is cylindrical and is produced by setting the center O of the center hole 28 as the center of the radius of curvature R. By doing so, it is possible to position the xenon lamp 12 by merely inserting the xenon lamp 12 into the light source housing portion 23 and the position of the xenon lamp 12 can be disposed reliably and precisely at a predetermined position on the reflective surface.

That is, the second reflective surface 26 is composed of a pair of upper and lower front cylindrical surfaces 30, 31, a rear cylindrical surface 32, a pair of upper and lower parallel flat surfaces 33, 34, and a pair of upper and lower inclined flat surfaces 35, 36.

The upper and lower front cylindrical surfaces 30, 31 and the rear cylindrical surface 32 are composed of cylindrical curved surfaces where an arc that is centered on the center O of the center hole 28 and has half the diameter of the xenon lamp 12 as the radius of curvature R extends in the axial direction. Portions in front of a perpendicular plane (a plane in a Y axis that is a perpendicular direction to an X axis) that passes through the center O of the center hole 28 and extends in a direction perpendicular to the center plane L are set as the front cylindrical surfaces 30, 31, and a portion behind points where extensions of lines that join the respective contiguous portions B1, B2 and the center O intersect the cylindrical curved surface is set as the rear cylindrical surface 32.

The pair of parallel flat surfaces 33, 34 are formed of flat surfaces that have perpendicular intersection portions C1 and C2 where the perpendicular plane (the plane in the Y axis that is a perpendicular direction to the X axis) that passes through the center O of the center hole 28 and extends in a direction perpendicular to the center plane L intersects the pair of front cylindrical surfaces 30, 31 as respective one ends thereof, extend tangentially from the perpendicular intersection portions C1 and C2, and have second intersection portions E1 and E2 where the inclined flat surfaces 35, 36 are intersected as respective other ends thereof.

It should be noted that although the upper and lower perpendicular intersection portions C1, C2 should preferably be points on the perpendicular plane 38, the present invention is not limited to this and the perpendicular intersection portions C1, C2 may be set slightly in front of such points or slightly behind such points.

That is, for the present invention the parallel flat surfaces 33, 34 do not need to be strictly parallel with the center plane L. For example, the perpendicular intersection portions C1, C2 may be set at positions that are displaced from the perpendicular plane 38 toward the opening 13a side, and in this case the parallel flat surfaces extend toward the rear surface from the opening 13a side. Alternatively, the perpendicular intersection portions C1, C2 may be set at positions that are displaced from the perpendicular plane 38 toward the rear and in this case, the parallel flat surfaces extend toward the opening 13a from the rear surface side.

The pair of inclined flat surfaces 35, 36 are formed as flat surfaces that have first intersection portions D1 and D2, where the rear cylindrical surface 32 is intersected by extensions of lines that join the center hole and the contiguous portions B1 and B2 (where the pair of first reflective surfaces 24, 25 and the pair of front cylindrical surfaces 30, 31 intersect), as one ends thereof, extend tangentially from the first intersection portions D1 and D2, and the second intersection portions E1 and E2 where the pair of inclined flat surfaces 35, 36 are intersected as other ends thereof. In the same way as the perpendicular intersection portions C1, C2, the second intersection portions E1 and E2 are not limited to the positions shown in FIG. 1, and may be appropriately displaced toward the front or the rear in accordance with the positions of the perpendicular intersection portions C1, C2.

As the material of the reflector 13 with this construction, it is possible to use "MIRO" (registered trademark) made by ANORAD CORP. of Germany. "MIRO" is produced by vacuum depositing high-purity aluminum on the surface of an aluminum substrate and then increasing reflectivity by depositing a transparent oxide film. However, the material of the reflector 13 is not limited to this and it is possible to use a variety of materials whose total reflectivity of light is high.

The xenon lamp 12 used as the light source includes a tube-like lamp 12a in which high-pressure xenon gas is sealed, and electrode terminals 12b, 12b that protrude outwards from both ends of the lamp 12a. When the xenon lamp 12 is inserted into the center hole 28 of the reflector 13, the electrode terminals 12b, 12b at both ends and both end portions of the lamp 12a protrude outward from both side portions of the light source housing portion 23.

The reflector 13 on which the xenon lamp 12 has been mounted is mounted on the holder 14 disposed on a rear surface of the reflector 13. The holder 14 is made of a trough-shaped member whose cross-sectional form is substantially C-shaped, with the light source housing portion 23 of the reflector 13 being inserted into and engaging a concave portion 39 surrounded by a rear surface portion 14a and an upper surface portion 14b and a lower surface portion 14c that are contiguous with both ends of the rear surface portion 14a. The upper surface portion 14b and the lower surface portion 14c of the holder 14 are respectively provided with engagement hooks 40 for engaging and holding the protector 11 and a plurality of positioning protrusions 41 for positioning the protector 11 at a predetermined depth.

As one example, ABS resin (acrylo nitrile-butadiene-styrene resin) can be favorably used as the material of the holder 14, but the material is not limited to this and it is possible to use other plastics, of course, or a non-plastic material, such as metal.

The holder 14 and the reflector 13 are integrally fixed to one another by being compressed by the shield rubber 15. The shield rubber 15 is composed of a pair of support portions 15a, 15a that support both ends of the xenon lamp 12 and a connecting portion 15b that connects both support portions 15a, 15a, and is integrally constructed of an elastic material. The pair of support portions 15a, 15a are respectively provided with support holes 15c into which the respective end portions of the xenon lamp 12 are inserted. As one example, silicon rubber can be favorably used as the material of the shield rubber 15, but it should be obvious that other rubber-like elastic members can be used.

The flexible PCB 16 for electrically connecting a power supply for supplying power to the xenon lamp 12 is provided on a rear surface of the shield rubber 15. The flexible PCB 16 includes electrode terminal portions 16a, 16a, which are connected to the electrode terminals 12b, 12b that protrude outward at both ends in the axial direction of the xenon lamp 12, and an earth terminal portion 16b that is connected to the reflector 13. The terminal portions 16a, 16a and 16b are connected to the electrode terminals 12b, 12b and the reflector 13 to electrically connect such portions.

The protector 11 is formed of a transparent material and is detachably mounted on a front portion of the reflector 13. The protector 11 is composed of a main portion 11a that covers a region of the light source housing portion 23 of the reflector 13 from a midway portion to the front and is open on only one side, and cover portions 11b, 11b that cover the outsides of the electrode terminals 12b, 12b of the xenon lamp 12 that is housed in the light source housing portion 23, and is provided with a Fresnel lens 43 on a front surface thereof. In addition, engagement holes 44 that respectively engage the upper and lower engagement hooks 40 of the holder 14 are respectively provided in the upper and lower surfaces of the main portion 11a.

The electronic flash device 10 of the construction described above can be easily assembled as described below, for example. First, the xenon lamp 12 that is the light source is mounted on the light source housing portion 23 of the reflector 13. This is carried out by inserting the xenon lamp 12 from the side into one of the holes 23a of the light source housing portion 23 and by having the electrode terminals 12b, 12b respectively protrude from both ends.

Next, the light source housing portion 23 of the reflector 13 is fitted into the concave portion 39 of the holder 14 so that the reflector 13 is supported by the holder 14. After this, the electrode terminals 12b, 12b are respectively inserted into the support holes 15c, 15c at both ends of the shield rubber 15 so that the side surfaces of the light source housing portion 23 and the holder 14 are covered by the respective support portions 15a. At this time, the earth terminal portion 16b of the flexible PCB 16 is electrically connected to the holder 14 in advance.

Figure 9:
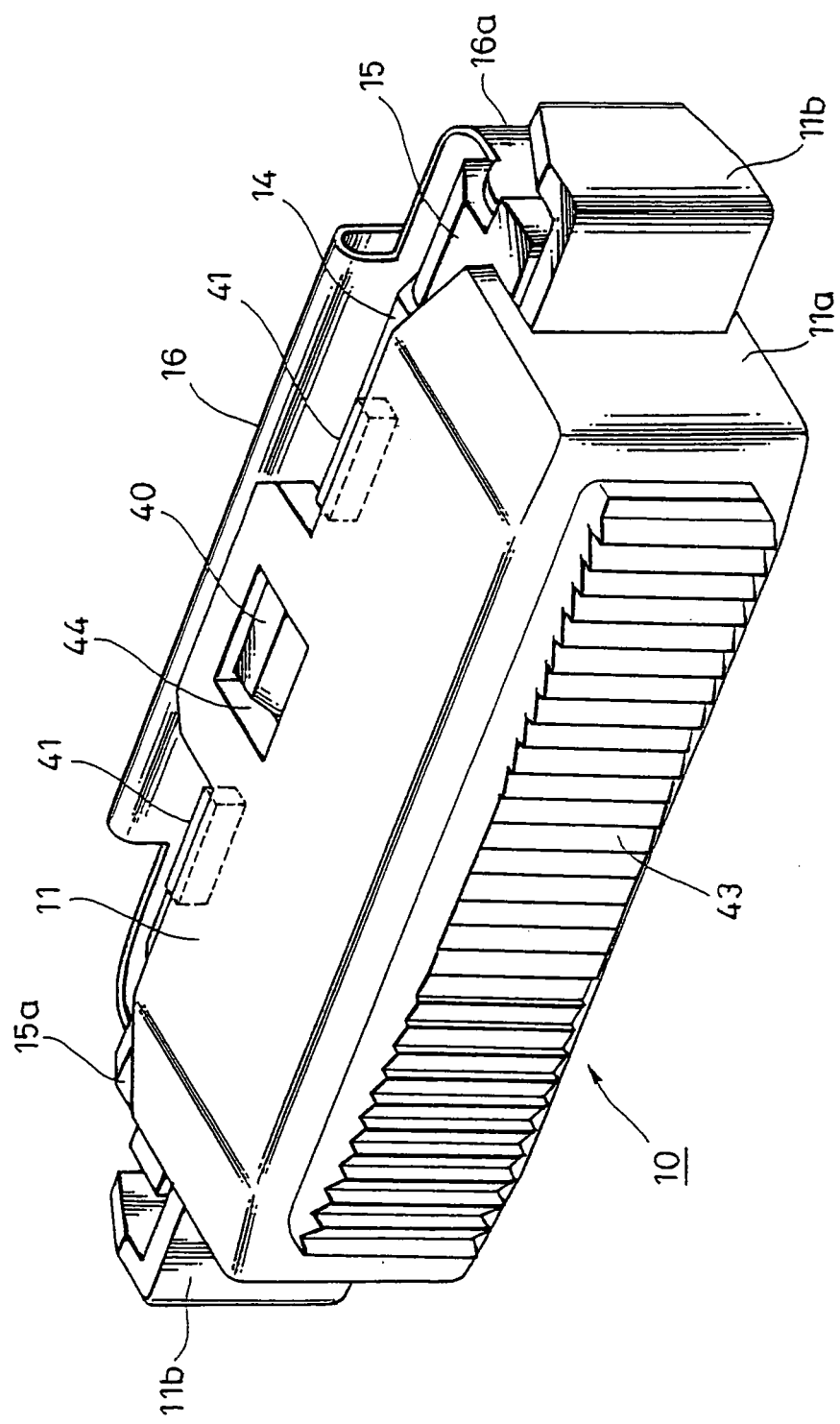
FIG. 9 is a perspective view showing the embodiment of an electronic flash device according to the present invention shown in FIG. 8 in an assembled state.

Next, after the shield rubber 15 has been mounted, the electrode terminal portions 16a, 16a at both ends of the flexible PCB 16 are respectively placed over the outsides of the electrode terminals 12b, 12b of the xenon lamp 12. The electrode terminals 12b and the electrode terminal portions 16a are then electrically connected by soldering. After this, the protector 11 is attached to the front portion of the reflector 13. By doing so, the assembly process is completed and the electronic flash device 10 shown in FIG. 9 is obtained.

Next, the operation of the electronic flash device 10 assembled in this way will be described with reference to FIGS. 2A to 2C and FIGS. 3A to 3C. In the illustrated embodiment, the maximum light distribution angle is set at 45° (the upper light distribution angle is 22.5° and the lower light distribution angle is also 22.5°), and the center O of the xenon lamp 12 is set as the focal point of the rear cylindrical surface 32.

FIG. 2A shows an optical path of light S1 within a range of the upper light distribution angle αu and light S2 within a range of the lower light distribution angle αd, such light being light out of the light outputted from the center O of the xenon lamp 12 that is directly oriented toward the opening 13a. In this case, the light S1 and the light S2 propagate directly and are emitted to the front within the range from point A1 to point A2 at ends on the opening 13a sides of the pair of first reflective surfaces 24, 25, that is, within the maximum light distribution angle α (α=αu+αd).

At this time, out of the light outputted from the center O of the xenon lamp 12, light S3 that is directed toward the rear surface side within a range of the same maximum light distribution angle α is emitted onto the upper first intersection portion D1 and the lower intersection portion D2 of the rear cylindrical surface 32. The range from the upper first intersection portion D1 to the lower intersection portion D2 is an arc produced by the radius of curvature R (the radius of the xenon lamp 12) about the center O that is the focal point of the rear cylindrical surface 32, so that the light S3 incident on the rear cylindrical surface 32 is reflected back on the optical path that has been passed by the light S3 as reflected light that is directed toward the opening 13a.

FIG. 2B shows the optical path of light S4 that is emitted onto the upper parallel flat surface 33 between the upper perpendicular intersection portion C1 and the upper second intersection portion E1, out of the light that is outputted from the center O of the xenon lamp 12 and is directed toward the second reflective surface 26 (the light emitted onto the lower parallel flat surface 34 between the lower perpendicular intersection portion C2 and the lower second intersection portion E2 is the same due to the symmetry of the form in the up-down direction).

The light S4 outputted from the center O of the xenon lamp 12 is incident on a rear surface side of the upper parallel flat surface 33 at an angle so that the reflected light becomes incident on the rear cylindrical surface 32 so as to become further inclined toward the rear surface. This light incident on the rear cylindrical surface 32 is reflected in accordance with the incident angle so as to be redirected toward the opening 13a, propagates toward the opening 13a within the range of the lower light distribution angle αd, and is emitted to the front from the opening 13a.

FIG. 2C shows the optical path of light S5 that is emitted onto the upper front cylindrical surface 30 in the range from the upper contiguous portion B1 to the upper perpendicular intersection portion C1 out of the light that is outputted to the second reflective surface 26 from the center O of the xenon lamp 12 (the light emitted onto the lower front cylindrical surface 31 in the range from the lower contiguous portion B2 to the lower perpendicular intersection portion C2 is the same due to the symmetry of the form in the up-down direction).

Since the light S5 from the center O of the xenon lamp 12 is emitted perpendicularly onto the upper front cylindrical surface 30, the reflected light is reflected back on the optical path that has been passed by the light S5 toward the opposite side and becomes incident on the lower parallel flat surface 34. The light incident on the lower parallel flat surface 34 is reflected further toward the rear surface and becomes incident on the rear cylindrical surface 32. This light incident on the rear cylindrical surface 32 is reflected in accordance with the incident angle so as to be redirected toward the opening 13a, propagates toward the opening 13a within the range of the lower light distribution angle αd, and is emitted to the front from the opening 13a.

Figure 3A:
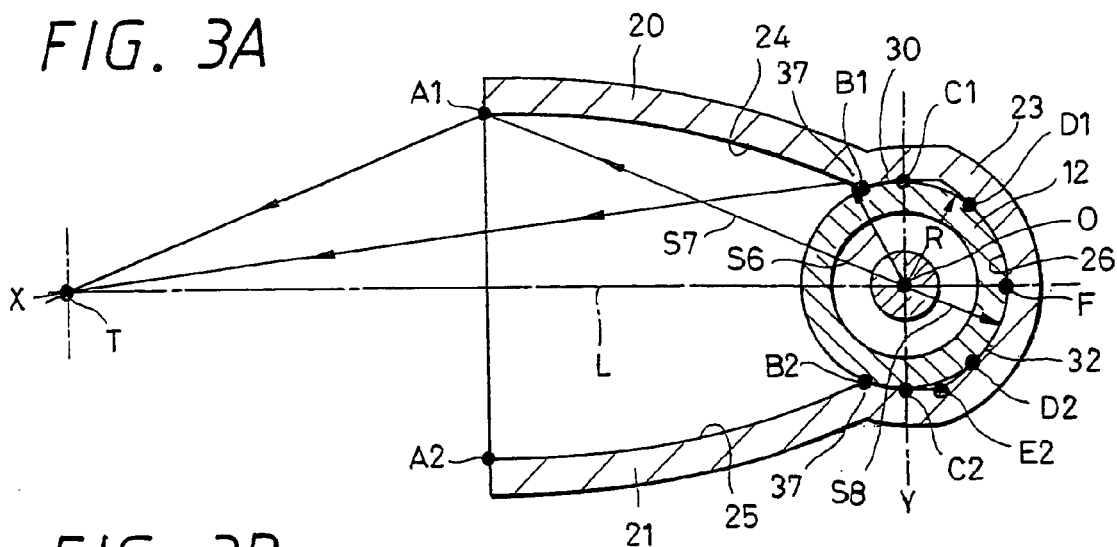
FIG. 3A is a diagram useful in explaining the optical paths of the same reflector for an electronic flash device, and shows a state where light is primarily reflected by first reflective surfaces.

FIG. 3A shows the optical paths of light S6 and S7 that are emitted onto the upper first reflective surface 24 between the point A1 and the upper contiguous portion B1, out of the light that is outputted from the center O of the xenon lamp 12 toward the opening 13a side (the light emitted onto the lower first reflective surface 25 between the point A2 and the lower contiguous portion B2 are the same due to the symmetry of the form in the up-down direction).

The light S6 and S7 emitted from the center O of the xenon lamp 12 are incident on the upper first reflective surface 24 at an angle to the opening 13a. Here, since the focal point of the upper first reflective surface 24 is the point T (this is also the case for the lower first reflective surface 25), the reflected light for both the light S6 and the light S7 that has been reflected by the upper first reflective surface 24 propagates toward the focal point T. By doing so, in the same way as the direct light in FIG. 2A, the light incident on the area from the point A1 to the upper contiguous portion B1 that is the upper first reflective surface 24 entirely becomes reflected light within the upper light distribution angle αu and is emitted to the front from the opening 13a.

At this point, light S8 that is directed toward the rear surface in a range between the point A1 and the upper contiguous portion B1, out of the light that is outputted from the center O of the xenon lamp 12 (the range between the point A2 and the lower contiguous portion B2 is the same) is incident in a range of the rear cylindrical surface 32 between the upper first intersection portion D1 and the lower first intersection portion D2. Accordingly, the light S8 incident in the range of the rear cylindrical surface 32 from the upper first intersection portion D1 to the lower first intersection portion D2 returns on the optical path passed by the light S8, is reflected by the upper first reflective surface 24 (the lower first reflective surface 25 is the same), and so is emitted to the front from the opening 13a.

Figure 3B:
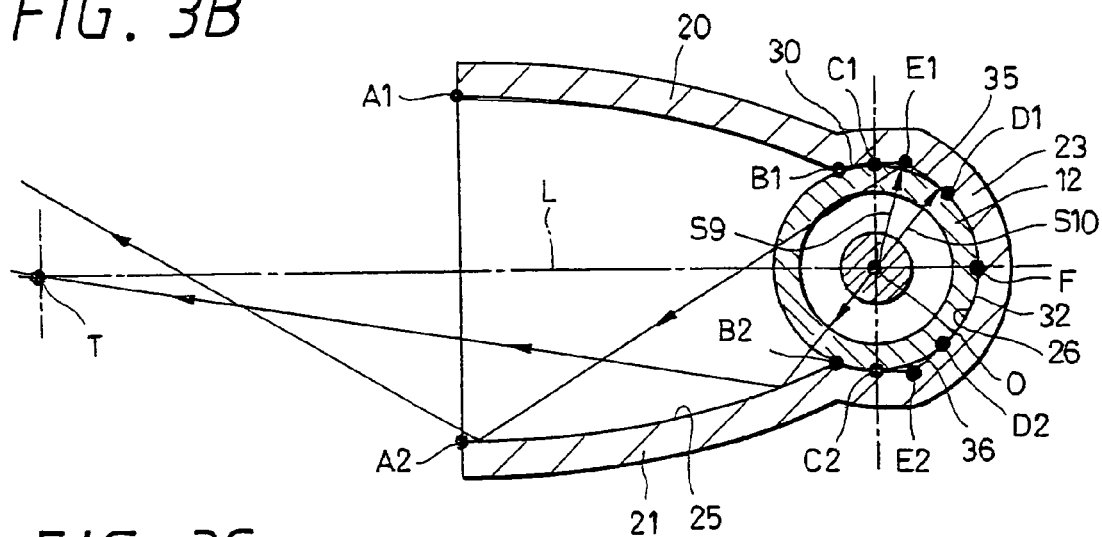
FIG. 3B is a diagram useful in explaining the optical paths of the same reflector for an electronic flash device, and shows a state where light is primarily reflected by inclined flat surfaces.

FIG. 3B shows the optical paths of light S9 and S10 that is emitted onto the upper inclined flat surface 35 in a range between the upper second intersection portion E1 to the upper first intersection portion D1, out of the light that is outputted to the second reflective surface 26 from the center O of the xenon lamp 12 (the light emitted onto the lower inclined flat surface 36 in a range between the lower second intersection portion E2 to the lower first intersection portion D2 is the same due to the symmetry of the form in the up-down direction).

The light S9 emitted from the center O of the xenon lamp 12 is incident on the upper inclined flat surface 35 at an angle, and is reflected in accordance with the incident angle so as to be redirected toward the opening 13a. The light is then reflected and redirected upward by the lower first reflective surface 25 and is emitted to the front from the opening 13a within the range of the light distribution angle α.

The light S10 emitted from the center O of the xenon lamp 12 is incident on the upper inclined flat surface 35 in a perpendicular state, and therefore the reflected light returns in the opposite direction on the optical path passed by the light S10. This reflected light is further reflected by the lower first reflective surface 25 at the front and is redirected upward. After this, the light propagates toward the focal point T and is emitted to the front from the opening 13a.

Figure 3C:
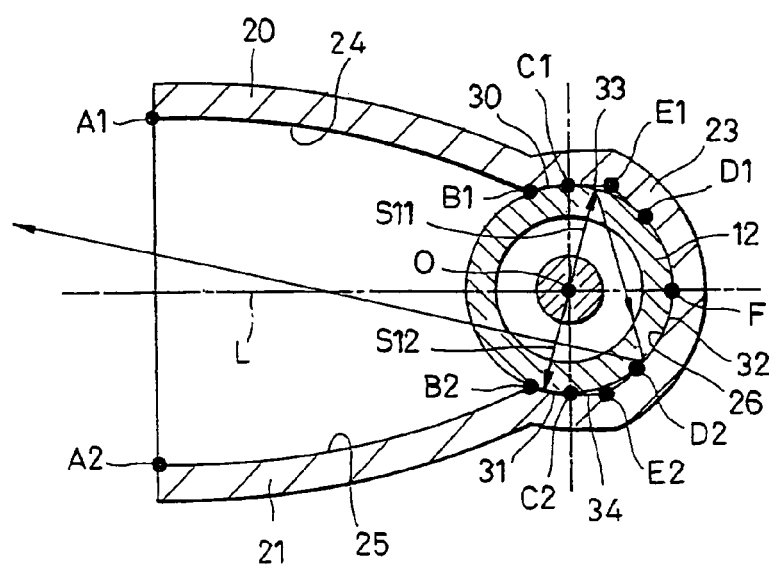
FIG. 3C is a diagram useful in explaining the optical paths of the same reflector for an electronic flash device, and shows a state where light is primarily reflected by parallel flat surfaces.

Out of light that is emitted from the center O of the xenon lamp 12 and is directed toward the second reflective surface 26, FIG. 3C shows optical paths of light S11 that is emitted onto the upper parallel flat surface 33 in a range from the upper perpendicular intersection portion C1 to the upper second intersection portion E1 (the light emitted onto the lower parallel flat surface 34 in a range from the lower perpendicular intersection portion C2 to the lower second intersection portion E2 is the same due to the symmetry of the form in the up-down direction) and of light S12 that is emitted onto the lower front cylindrical surface 31 in a range from the lower contiguous portion B2 to the lower perpendicular intersection portion C2 (the light emitted onto the upper front cylindrical surface 30 in a range from the upper contiguous portion B1 to the upper perpendicular intersection portion C1 is the same due to the symmetry of the form in the up-down direction).

Since the light S11 outputted from the center O of the xenon lamp 12 is incident on the upper parallel flat surface 33 at an angle, the reflected light is reflected in accordance with the incident angle so as to be redirected toward the rear surface. This reflected light is incident on the rear cylindrical surface 32 and is reflected in accordance with the incident angle so as to be redirected toward the opening 13a. The light propagates toward the opening 13a and is emitted to the front from the opening 13a within the range of the light distribution angle α.

The light S12 outputted from the center O of the xenon lamp 12 is incident on the lower front cylindrical surface 31 in a perpendicular state, and therefore the reflected light returns in the opposite direction on the optical path passed by the light S12. This reflected light is incident on the upper parallel flat surface 33 and then passes on the same optical path as the light S11 mentioned above via the upper parallel flat surface 33 and the rear cylindrical surface 32 so that the propagation direction is redirected toward the front and the light is emitted to the front from the opening 13a.

In this way, according to the present embodiment, light that is directly emitted forward from the xenon lamp 12 that is the light source is emitted to the front either directly or after being reflected by the first reflective surfaces 24, 25 and so is emitted to the front as in the conventional art with no change. However, the reflection efficiency for the light emitted from the xenon lamp 12 toward the rear is greatly increased by the second reflective surface 26.

That is, when the light reflected by the second reflective surface 26 is considered, light is reflected in a range of O to ±22.5° by the rear cylindrical surface 32 between the upper first intersection portion D1 and the lower first intersection portion D2. Also, the light incident on the upper parallel flat surface 33 from the upper perpendicular intersection portion C1 to the upper second intersection portion E1 and the lower parallel flat surface 34 from the lower perpendicular intersection portion C2 to the lower perpendicular intersection portion E2 is primarily reflected by the rear cylindrical surface 32 and is emitted to the front either directly or having been secondarily reflected by the first reflective surfaces 24, 25. Also, the light incident on the upper parallel flat surface 35 from the upper second intersection portion E1 to the upper first intersection portion D1 and on the lower inclined flat surface 36 from the lower second intersection portion E2 to the lower first intersection portion D2 is reflected toward the reflector 13 by these flat surfaces and is emitted to the front either directly or having been secondarily reflected by the first reflective surfaces 24, 25.

Also, the light incident on the upper front cylindrical surface 30 from the upper contiguous portion B1 to the upper perpendicular intersection portion C1 and the lower front cylindrical surface 31 from the lower contiguous portion B2 to the lower perpendicular intersection portion C2 is primarily reflected by the upper and lower parallel flat surfaces 33, 34 or the inclined flat surfaces 35, 36, is secondarily reflected by the rear cylindrical surface 32 or the first reflective surfaces 24, 25, and is further reflected a third or more times so that all of the light is emitted to the outside from the opening 13a at the front. By doing so, it is possible to output light while thoroughly suppressing thermal conversion due to reflection absorption inside the reflector 13 and a large amount of the light can be used as effective light.

Therefore, according to the present embodiment, it is possible to efficiently emit all of the direct light and reflected light within a predetermined light distribution angle.
TABLE 1
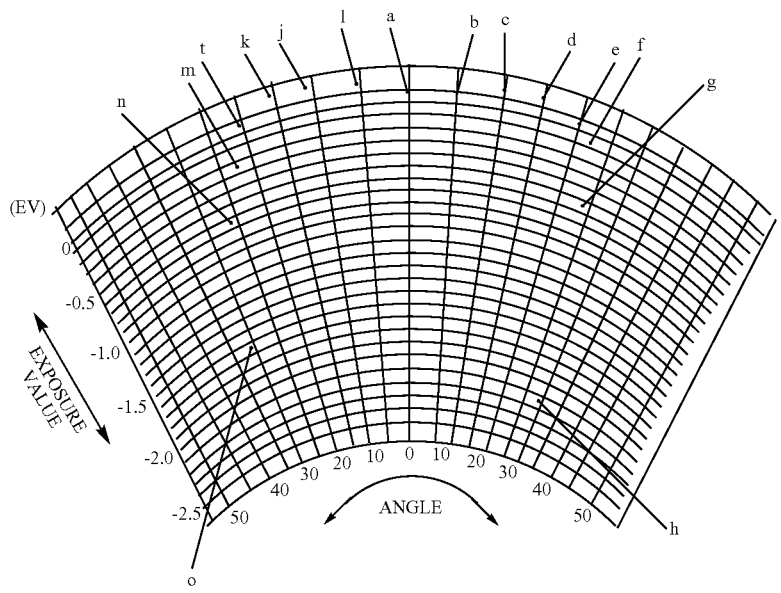
TABLE 2
| UPPER ANGLE (UP) | 0.0' | 5.0' | 10.0' | 15.0' |
|---|---|---|---|---|
| | a | b | c | d |
| MEASUREMENT VALUE | 0.048 | 0.036 | 0.152 | 0.199 |
| | 20.0' | 22.5' | 25.0' | 30.0' |
| | e | f | g | h |
| | 0.042 | −0.094 | −0.520 | −2.267 |
TABLE 2-continued
| LOWER ANGLE (UP) | — | 5.0' | 10.0' | 15.0' |
|---|---|---|---|---|
| | | i | j | k |
| MEASUREMENT VALUE | — | 0.097 | 0.206 | −0.122 |
| | 20.0' | 22.5' | 25.0' | 30.0' |
| | l | m | n | O |
| | 0.025 | −0.248 | −0.671 | −1.542 |
TABLE 3
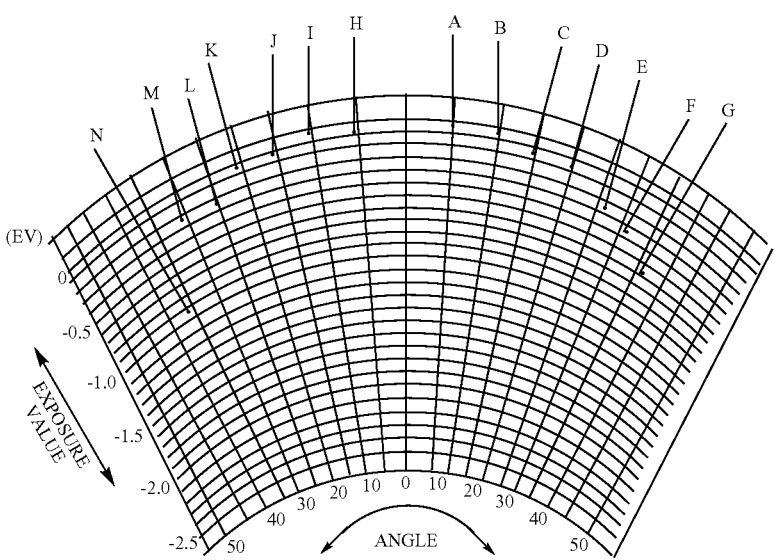

TABLE 4

| | | | | |
|---|---|---|---|---|
| RIGHTWARD ANGLE (RIGHT) | 5.0' A | 10.0' B | 15.0' C | 20.0' D |
| MEASUREMENT VALUE | 0.058 | 0.036 | −0.017 | −0.091 |
| | — | 25.0' E | 30.0' F | 35.0' G |
| | — | −0.212 | −0.375 | −0.561 |
| LEFTWARD ANGLE (LEFT) | 5.0' H | 10.0' I | 15.0' J | 20.0' K |
| MEASUREMENT VALUE | 0.077 | 0.029 | −0.024 | −0.084 |
| | — | 25.0' L | 30.0' M | 35.0' N |
| | — | −0.177 | −0.280 | −4.26 |

Table 1, Table 2, Table 3, and Table 4 show experiment results for the embodiment described above. In these experiments, GNo (grade number) 5, 66 µF, and a xenon tube with a diameter of 1.8 mm, an overall length of 20 mm, and an arc length of 11±0.5 mm as a light source were used, and acrylic resin was used as the protector.

Table 1 shows the content of Table 2 as a graph and Table 3 shows the content of Table 4 as a graph. In Table 1 and in Table 3, the fan-shaped width direction indicates angles in the width direction of the electronic flash device 10, while the vertical direction shows exposure values (EV). The exposure values (EV) are expressed with the value "0" indicating a reference value, with "−1.0" indicating $1/\sqrt{2}$ of the reference value and "−2.0" indicating ½ of the reference value.

Table 2 shows values found by measuring exposure values (EV) at various angle positions in the up-down direction with the center plane L as a reference. In addition, Table 4 shows values found by measuring exposure values (EV) at various angle positions in the left-right direction with the center of the electronic flash device 10 as the reference value of 0°. As one example, the measured value for an upward angle of 10° was 0.152, and the measured value for a leftward angle of 15° was −0.024.

Figure 4:
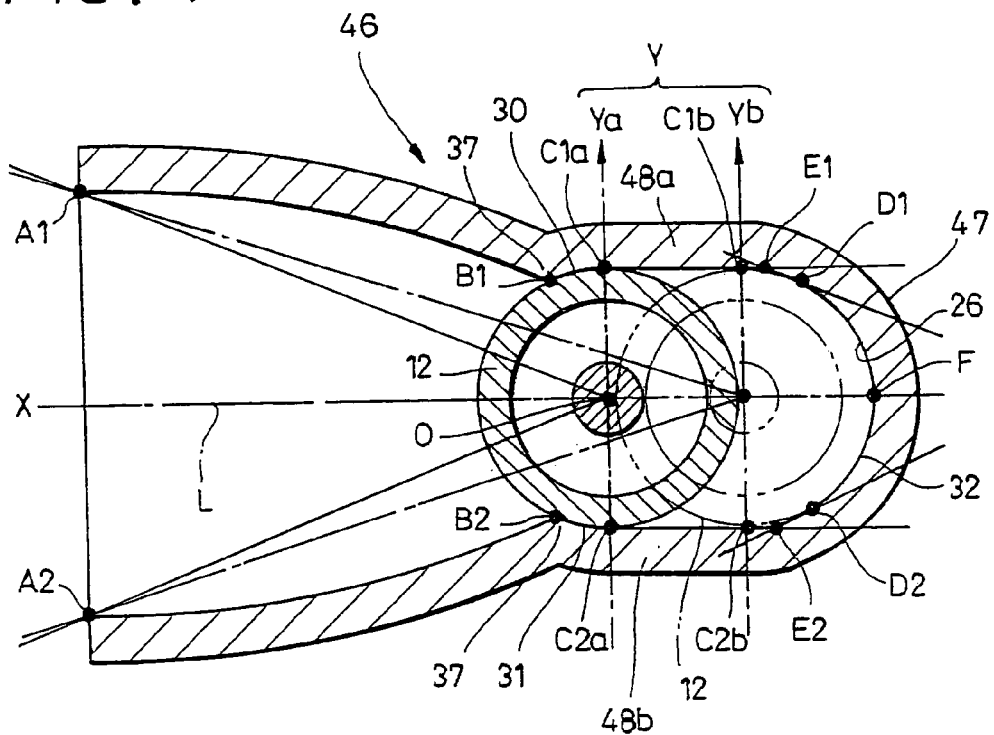
FIG. 4 is a diagram useful in explaining the cross-sectional form of a second embodiment of a reflector for an electronic flash device according to the present invention.

FIG. 4 shows a second embodiment of a reflector according to the present invention. The reflector 46 is composed of a light source housing portion 47 produced by making the light source housing portion 23, which has a substantially circular cross-sectional form in the above embodiment, oval (a flat oval) in cross section. The light source housing portion 47 is provided with flat surface portions 48a, 48b produced by extending the parallel flat surfaces in the previous embodiment (the flat surfaces from the front perpendicular intersection portion C1 to the rear perpendicular intersection portion C2) along the central plane L (the flat surface portions 48a, 48b are from a front upper perpendicular intersection portion C1a to a rear upper perpendicular intersection portion C1b and front lower perpendicular intersection portion C2a to a rear lower perpendicular intersection portion C2b). The other portions of the construction are the same as in the previous embodiment and therefore have been assigned the same reference numerals and description thereof has been omitted.

According to the second embodiment, the cross-sectional form of the second reflective surface is oval with respect to the optical axis, so that the xenon lamp 12 that is the light source can be moved in the optical axis direction to adjust the attachment position thereof. For this reason, it is possible to adjust the light distribution angle by moving the attachment position of the xenon lamp 12 forward and backward relative to the reflective surface. In addition, it is possible to use a construction where the xenon lamp 12 is moved forward and backward in concert with a zoom operation of a camera, and in this case, it is possible to change the irradiation angle in accordance with a zoom operation. It should be noted that the inner surfaces of the flat surface portions 48a, 48b are of course reflective surfaces in the same way as the other surfaces.

Figure 5:
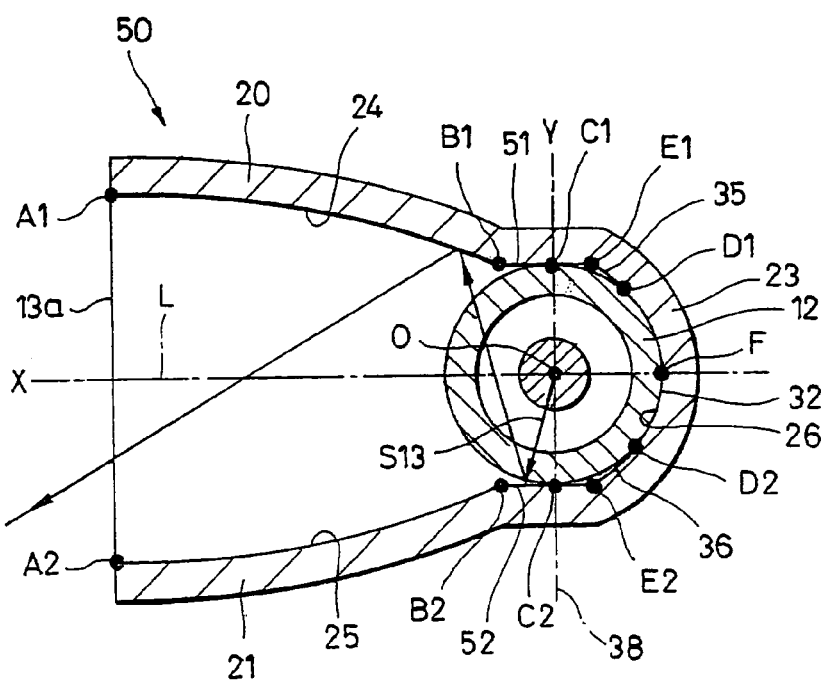
FIG. 5 is a diagram useful in explaining the cross-sectional form of a third embodiment of a reflector for an electronic flash device according to the present invention.

FIG. 5 shows a third embodiment of a reflector according to the present invention. This reflector 50 is constructed without the upper front cylindrical surfaces 30, 31 of the previous embodiments and with parallel flat surfaces 51, 52 produced by extending the parallel flat surfaces 33, 34 toward the opening 13a so that the parallel flat surfaces 33, 34 directly intersect the first reflective surfaces 24, 25. The first reflective surfaces 24, 25 are obtained as curved surfaces formed by setting the center O of the light source as the center of the radius of curvature. The other portions of the construction are the same as in the previous embodiment and therefore have been assigned the same reference numerals and description thereof has been omitted.

According to the third embodiment, when the light S13 is emitted from the center O of the xenon lamp 12 to portions out of the parallel flat surfaces 33, 34 on the opening 13a side of the perpendicular plane 38 that are between the upper contiguous portion B1 and the upper perpendicular intersection portion C1 (the case of the portion from the lower contiguous portion B2 to the lower perpendicular intersection portion C2 is the same), the light is incident on the lower parallel flat surface 52 at an angle (the same also applies to the upper parallel flat surface 51). In this case, the reflected light is reflected primarily, secondarily, or more times by the upper and lower parallel flat surfaces 51, 52 and the first reflective surfaces 24, 25 in accordance with the incident angle and propagates toward the opening 13a and is emitted to the front from the opening 13a within the light distribution angle α.

Light that is outputted from the center O of the xenon lamp 12 and emitted onto the other portions is emitted in the same way as in the other embodiments. The second embodiment with this construction can achieve the same effects as the first embodiment described above.

Figure 6:
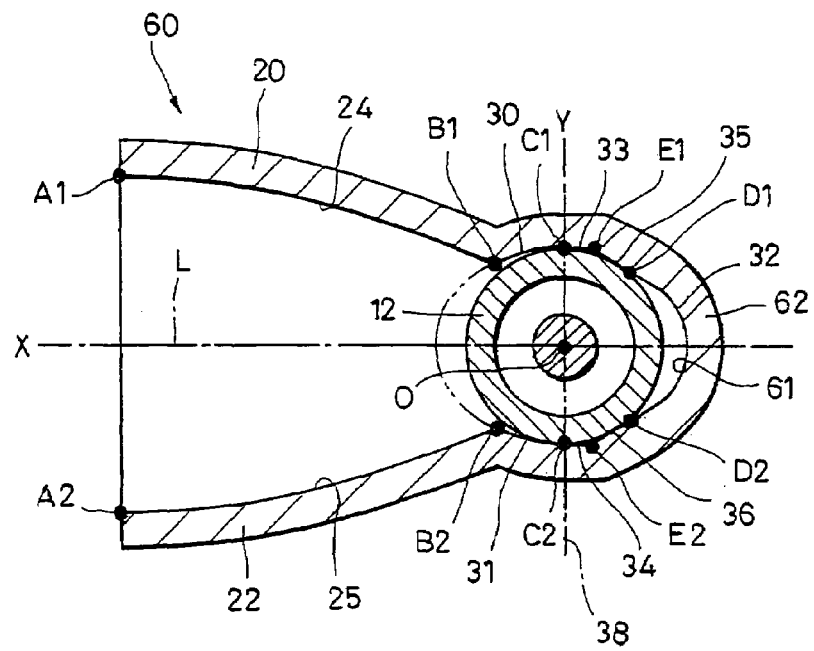
FIG. 6 is a diagram useful in explaining the cross-sectional form of a fourth embodiment of a reflector for an electronic flash device according to the present invention.

FIG. 6 shows a fourth embodiment of a reflector according to the present invention. This reflector 60 is constructed by making the second reflective surface 26 of the first embodiment oval. A second reflective surface 61 according to the fourth embodiment is set in the same way on an inner surface of the light source housing portion 62 and is constructed with the X-axis as the major axis and the Y-axis as the minor axis. The other portions of the construction are the same as in the previous embodiments and therefore have been assigned the same reference numerals and description thereof has been omitted. The fourth embodiment with this construction can achieve the same effects as the first embodiment described above.

Figure 7:
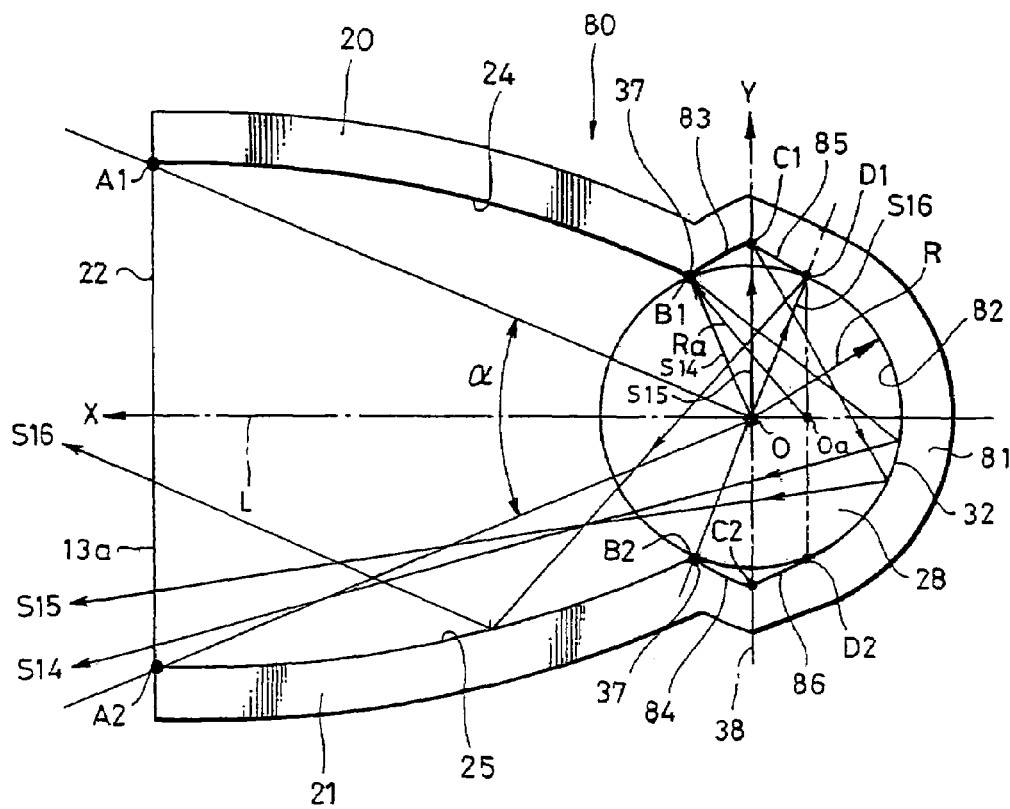
FIG. 7 is a diagram useful in explaining the cross-sectional form of a fifth embodiment of a reflector for an electronic flash device according to the present invention.

FIG. 7 shows a fifth embodiment of a reflector according to the present invention. This reflector 80 is an embodiment where the shape of the second reflective surface is modified by changing the construction of the light source housing portion 23 of the first embodiment described above. That is, the reflector 80 is constructed of the upper surface portion 20, the lower surface portion 21, the left and right side surface portions 22 and a light source housing portion 81, but the upper surface portion 20, the lower surface portion 21, and the left and right side surface portions 22 are the same, and a second reflective surface 82, which is an inner surface of the light source housing portion 81 that is integrally formed and is contiguous with rear portions of the portions 20, 21, and 22, is characterized by being different to the second reflective surface 26 of the embodiments described above. For this reason, portions that are the same as in the first embodiment have been assigned the same reference numerals and duplicated description thereof has been omitted.

The second reflective surface 82 of the light source housing portion 81 of the reflector 80 includes: the rear cylindrical surface 32 that is a first curved surface portion obtained by setting the center O of the light source as the center of the radius of curvature R; upper and lower front curved surfaces 83, 84 that are second curved surfaces that respectively pass the upper contiguous portion B1 and the lower contiguous portion B2 and are obtained by setting a center Oa of a radius of curvature Ra behind the center O of the light source (on a side further from the upper and lower contiguous portions B1, B2); and inclined flat surface portions 85, 86 that are examples of a pair of inclined portions that are contiguous with both sides of the rear cylindrical surface 32, respectively extend in tangential directions from upper and lower first intersection portions D1, D2 where extensions of lines that join the upper and lower upper contiguous portions B1, B2 and the center O of the light source intersect the rear cylindrical surface 32, and extend as far as the upper and lower curved surfaces 83, 84 that intersect the perpendicular plane 38 that passes the center O.

The center Oa of the radius of curvature Ra of the upper and lower front curved surfaces 83, 84 may be set at a point of intersection dropped vertically to the center plane L from the upper and lower first intersections D1, D2. In this case, as described later, the light reflected by the respective upper and lower front curved surfaces 83, 84 can be respectively emitted to the outside from the opening 13*a* by being reflected only once by the rear cylindrical surface 32. The position of the center Oa of the radius of curvature Ra is not limited to the position in this embodiment and it should be obvious that the center may be set at a closer position to the center O than this position Oa or at a position further from the center O. In addition, the position of the center Oa of the radius of curvature Ra is not limited to the case where the center Oa is shifted from the center O of the light source away from the contiguous portions B1, B2, and the center Oa of the radius of curvature Ra may be displaced from the center O toward the contiguous portions B1, B2 and set closer to the opening 13*a* side than the center O.

In this fifth embodiment, out of the light emitted from the light source (the xenon lamp 12), light S14 directed toward the upper contiguous portion B1 (the lower contiguous portion B2 is the same due to the symmetry of the form in the up-down direction) is reflected by the upper contiguous portion B1 so as to be directed toward a central portion of the rear cylindrical surface 32 and is then reflected at the central periphery. By doing so, the light reflected by the rear cylindrical surface 32 propagates toward the front in accordance with the incident angle and is emitted from the opening 13*a* to the front within the light distribution angle α having been reflected only once.

Out of the light emitted by the xenon lamp 12, light S15 directed toward the upper perpendicular intersection portion C1 from the center O (the same is the case for the lower perpendicular intersection portion C2) is reflected by the upper perpendicular intersection portion C1 so as to be directed toward the rear cylindrical surface 32 and is reflected by a central periphery of the rear cylindrical surface 32. By doing so, the light reflected by the rear cylindrical surface 32 propagates toward the front in accordance with the incident angle and is emitted from the opening 13*a* to the front within the light distribution angle α having been reflected only once.

In addition, light S16 from the center O of the xenon lamp 12 that directed toward the upper first intersection portion D1 (the same is also the case for the lower first intersection portion D2) is reflected by the upper first intersection portion D1 and is redirected toward the lower first reflective surface 25 (in the case of the lower first intersection portion D2, toward the upper first reflective surface 24) and is emitted toward the front from the reflector 13 directly without being reflected by the rear cylindrical surface 32.

In this way, according to the present embodiment, since the upper and lower front curved surfaces 83, 84 are curved surfaces, out of the light emitted from the xenon lamp 12 that is the light source, the propagation direction of the light reflected by the upper and lower curved surfaces 83, 84 is redirected toward the front by being reflected only once by the rear cylindrical surface 32. In addition, in the case of the upper and lower inclined flat surface portions 85, 86, the light from the light source is redirected toward the front immediately due to such surface portions 85, 86 being flat surfaces. As a result, the light reflected by the upper and lower front curved surfaces 83, 84 or the upper and lower inclined flat surface portions 85, 86 is emitted to the front by being reflected only once or reflected twice, an extremely low number of reflections. In this way, the reflection efficiency of light can be made extremely high with the present embodiment.

It should be noted that although an example where the upper and lower perpendicular intersections C1, C2 on the perpendicular plane 38, which passes through the center O of the light source and is perpendicular with the center plane L, are used as the rear ends of the upper and lower front curved surfaces 83, 84 has been described in the embodiment shown in FIG. 7, the present embodiment is not limited to this and it should be obvious that the rear ends of the upper and lower front curved surfaces 83, 84 may be near the center O but slightly displaced toward the opening 13*a* or on the opposite side slightly displaced away from the opening 13*a*.

In short, for the present invention, the reflective surfaces 24, 25 and the inversely inclined portions are not concentric with the xenon lamp, and by increasing the inverse inclination, the light from the xenon lamp that strikes such inversely sloped portions can be efficiently directed to the opening 13*a*. Also, although the upper and lower inclined flat surface portions 85, 86 composed of flat surfaces are used as a pair of inversely inclined portions, it should be obvious that a pair of sloped curved surface portions composed of curved surfaces may be used.

Figure 10:
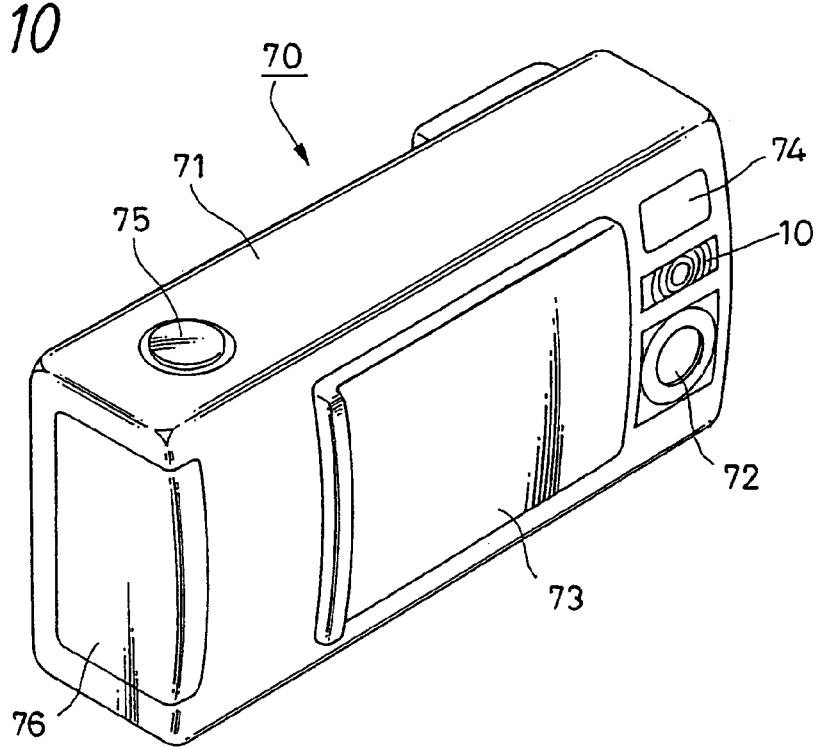
FIG. 10 is a perspective view of a digital still camera that is one embodiment of an electronic appliance in which the electronic flash device according to the present invention shown in FIG. 9 is used, in a state where a lens cover is open.
Figure 11:
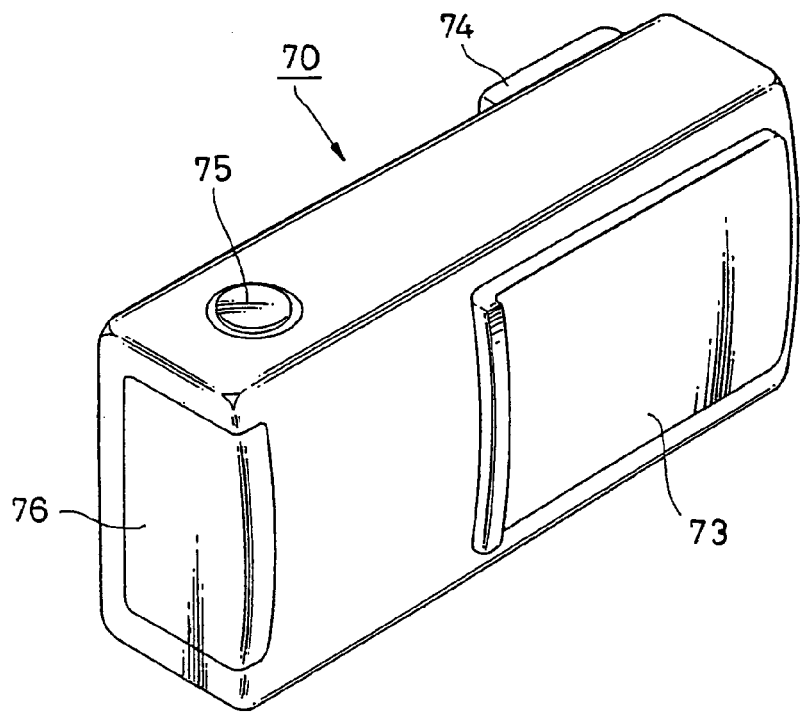
FIG. 11 is a perspective view showing a state where the lens cover of the digital still camera shown in FIG. 10 is closed.
Figure 12:
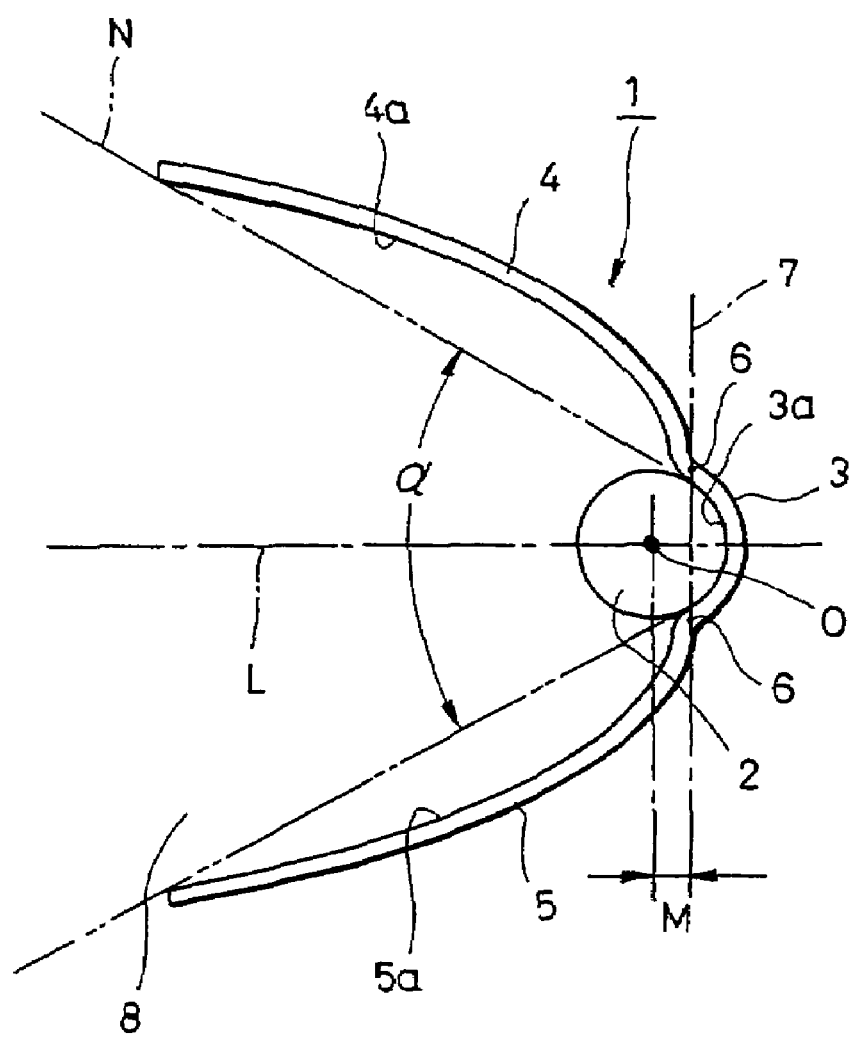
FIG. 12 is a diagram useful in explaining one example of a conventional reflector.

FIG. 10 and FIG. 11 show a digital still camera that is an image pickup apparatus as one embodiment of an electronic appliance in which the electronic flash device 10 with the construction described above is incorporated. This digital still camera 70 includes a camera case 71 in which a camera mechanism is housed and a lens cover 73 that can move and covers an image pickup lens 72 of the camera case 71.

The camera case 71 is a wide, hollow case, and a finder 74, the electronic flash device 10, and a lens system including the image pickup lens 72 are disposed in vertical alignment on the front surface of the camera case 71 on one side in the lengthwise direction. The lens cover 73 is attached to a substantially central portion of the camera case 71 so as to be capable of sliding in the lengthwise direction (width direction) By sliding the lens cover 73 it is possible to open and close the finder 74, the protector 11 of the electronic flash device 10, and the image pickup lens 72 at substantially the same time.

A shutter button 75 is disposed on an upper surface of the camera case 71. A battery cover 76 that allows a dry cell used as a power source to be inserted and removed is also attached onto one side surface of the camera case 71. By mounting and using the electronic flash device 10 on the digital still camera 70 with this construction, it is possible to provide an appliance that has high light emitting efficiency in spite of its small size and can record high-quality images even when shooting at night.

In an electronic appliance equipped with this kind of electronic flash device 10, when first reflective surfaces are curved surfaces whose cross-sectional form is composed of predetermined curves such as ovals or parabolas, by disposing the light source at a predetermined position on the curved surface, the wide diameter of the lamp inevitably results in the width of the opening becoming large, but with the present invention, the contiguous portions, where the pair of the first reflective surfaces and the second reflective surface are contiguous, are set closer to the opening than the center of the light source, so that the amount of light reflected by the second reflective surface can be increased.

As described above, in a strobe reflector according to the present invention that reflects luminous flux emitted from a light source on a reflective surface thereof, the reflective surface has a cross-sectional form including a pair of first reflective surfaces that are composed of predetermined curves, face one another, and have an opening, and a second reflective surface in an inside portion of which a light source is housed, where the contiguous portions of the first reflective surfaces and the second reflective surface are set closer to the opening than the center of the light source and the center of the light source is positioned closer to the opening than an imaginary line that joins the predetermined curves of the cross-sectional form of the first reflective surfaces.

By doing so, since the first reflective surfaces are curved surfaces whose cross-sectional form is composed of predetermined curves such as ovals or parabolas, when the light source is disposed at a predetermined position with respect to the curved surfaces, the width of the lamp inevitably results in the width of the opening becoming large, but with the present invention, a housing portion for the lamp is provided and the center of the lamp is positioned closer to the opening than the imaginary line, so that it is possible to direct the luminous flux in a predetermined direction using the first reflective surfaces.

An image-pickup apparatus according to the present invention includes an image pickup lens and a flash on a front surface thereof, wherein the flash includes a tube-like light source and a reflector on whose reflective surface luminous flux emitted from the light source is reflected, the reflector being constructed so that the cross-sectional form of the reflective surface includes a pair of first reflective surfaces that are composed of predetermined curves, face one another, and have an optical opening to the front surface of the image-pickup apparatus, and a second reflective surface in an inside portion of which a light source is housed, where a gap between the contiguous portions of the first reflective surfaces and the second reflective surface is smaller than a diameter of the light source.

At present, in image-pickup apparatuses such as a digital camera, the size of the image-pickup apparatuses themselves are becoming smaller due to miniaturization of portions such as the image pickup element and the memory. However, in conventional flashes, the reflective surfaces have been manufactured in accordance with the width of the lamps, so that there has been a limit on miniaturization.

On the other hand, according to the present invention, by including a light source housing portion and what can be called a "constriction" portion where the interval between the upper and lower contiguous portions of the first reflective surfaces that emit the light of the light source in a predetermined direction to the outside is smaller than the diameter of the light source, it is possible to use a construction where the surface that emits light from the light source in a predetermined direction to the outside can be increased by an amount corresponding to the constriction even if the opening is reduced, which makes it possible to miniaturize the image-pickup apparatus.

INDUSTRIAL APPLICABILITY

The present invention is not limited to the embodiments that have been described above and shown in the drawings and can be subjected to a variety of modifications without departing from the scope of the invention.

For example, although an example of a digital still camera 70 has been described in the above embodiment as an electronic appliance that uses the electronic flash device 10, the present invention is not limited to this and can be applied to a camcorder, an analog still camera, a conventional camera, a video camera equipped with a still image pickup function, or various other electronic appliances that use a flash device.

Also, although an example has been described where the lens system of the digital still camera 70 is fixed, a zoom lens, a spot lens, a macro lens, or the like can also be used. The present invention can also be applied to a reflector used in a fluorescent lamp (such as a hot cathode tube or a cold cathode tube). In addition, the upper and lower light distribution angles can be properly determined using the construction of the present invention described above, so that the time taken before fabrication can be commenced can be reduced and the cost of molds can be suppressed by not having to find such angles based on experimentation as in the conventional art.

The invention claimed is:

1. A reflector for an electronic flash device, comprising:
   a pair of first reflective surfaces that are composed of portions of a cylindrical curved surface and face one another; and
   a second reflective surface that is contiguous with said pair of first reflective surfaces and in an inside portion of which a light source is housed,
   wherein contiguous portions where said pair of first reflective surfaces and said second reflective surface are contiguous are set closer to an opening of said pair of first reflective surfaces than a center portion of the housed light source; and
   wherein said second reflective surface comprises:
      a curved surface portion produced by setting the center portion of the light source as a center of a radius of curvature;
      a pair of inclined flat surface portions that are contiguous with respective ends of said curved surface portion and extend in tangential directions therefrom; and
      a pair of parallel flat surface portions that are substantially parallel with a center plane about which said pair of first reflective surfaces are symmetrical, said parallel flat surface portions intersecting said inclined flat surface portions.

2. A reflector for an electronic flash device according to claim 1, wherein said curved surface portion comprises a cylindrical surface portion that is cylindrical, and wherein said inclined flat surface portions extend in tangential directions from first intersection portions where extensions of lines that join the contiguous portions and the center portion intersect said cylindrical surface portion, and extend as far as second intersection portions where said parallel flat surface portions are intersected.

3. A reflector for an electronic flash device according to claim 1, wherein a distance between the contiguous portions where said pair of first reflective surfaces and said second reflective surface are contiguous is smaller than a diameter of said curved surface portion that forms part of said second reflective surface.

4. A reflector for an electronic flash device according to claim 1, wherein said second reflective surface is formed in an oval shape so that a position of the light source can be moved and adjusted along the center plane.

5. A reflector for an electronic flash device according to claim 1, wherein said
pair of parallel flat surface portions extend substantially parallel with the center plane from perpendicular intersection portions where the radius of curvature intersects a perpendicular plane that passes the center portion and is perpendicular to the center plane; and
said pair of inclined flat surface portions extend in tangential directions from first intersection portions where extensions of lines that join the contiguous portions and the center portion intersect said curved surface portion, and extend as far as second intersection portions where said parallel flat surface portions are intersected.

6. A reflector for an electronic flash device according to claim 1, wherein said curved surface portion comprises an oval cylindrical surface portion produced by setting the center portion of the light source as a center of a radius of curvature; and
wherein said pair of inclined flat surface portions extend in tangential directions from first intersection portions where extensions of lines that join the contiguous portions and the center portion intersect said cylindrical surface portion, and extend as far as second intersection portions where said parallel flat surface portions are intersected.

7. A reflector for an electronic flash device, comprising:
a pair of first reflective surfaces that are composed of portions of a cylindrical curved surface and face one another; and
a second reflective surface that is contiguous with said pair of first reflective surfaces and in an inside portion of which a light source is housed,
wherein contiguous portions where said pair of first reflective surfaces and said second reflective surface are contiguous are set closer to an opening of said pair of first reflective surfaces than a center portion of the housed light source; and
wherein said second reflective surface comprises:
a first curved surface portion produced by setting the center portion of the light source as a center of a radius of curvature;
a second curved surface portion that passes the contiguous portions and is obtained by displacing a center of a radius of curvature either closer to or further from the contiguous portions than the center portion of the light source; and
a pair of inclined portions that are contiguous with both sides of said first curved surface portion, extend in tangential directions from first intersection portions where extensions of lines that join the contiguous portions and the center portion intersect said first curved surface portion, and extend as far as said second curved portion that intersects a perpendicular plane that passes the center portion and is perpendicular with a center plane about which said pair of first reflective surfaces are symmetrical.

8. A reflector for an electronic flash device according to claim 7, wherein the center portion of the radius of curvature of said second curved surface portion is set at a point of intersection perpendicularly dropped to the center plane from the first intersection portions where extensions of lines that join the contiguous portions and the center portion intersect said first curved surface portion, or at a point of intersection near said point of intersection.

9. An electronic flash device comprising:
a light source; and
a reflector that reflects light emitted from said light source on a reflective surface thereof,
wherein said reflector includes:
a pair of first reflective surfaces that form part of a cylindrical curved surface and face one another; and
a second reflective surface that is contiguous with said pair of first reflective surfaces and in an inside portion of which the light source is housed, and
contiguous portions where said pair of first reflective surfaces and said second reflective surface are contiguous are set closer to an opening in said pair of first reflective surfaces than a center portion of the housed light source; and
wherein said second reflective surface comprises:
a curved surface portion produced by setting the center portion of the light source as a center of a radius of curvature;
a pair of inclined flat surface portions that are continuous with respective ends of said curved surface portion and extend in tangential directions therefrom; and
a pair of parallel flat surface portions that are substantially parallel with a center plane about which said pair of first reflective surfaces are symmetrical, said parallel flat surface portions intersecting said inclined flat surface portions.

10. An electronic flash device according to claim 9, wherein said curved surface portion comprises a cylindrical surface portion that is cylindrical, and wherein said inclined flat surface portions extend in tangential directions from first intersection portions where extensions of lines that join the contiguous portions and the center portion intersect said cylindrical surface portion, and extend as far as second intersection portions where said parallel flat surface portions are intersected.

11. An electronic flash device according to claim 9, wherein a distance between the contiguous portions where said pair of first reflective surfaces and said second reflective surface are contiguous is smaller than a diameter of said curved surface portion that forms part of said second reflective surface.

12. An electronic flash device according to claim 9, wherein said second reflective surface is formed in an oval shape so that a position of the light source can be moved and adjusted along the center plane.

13. An electronic flash device according to claim 9, wherein said
pair of parallel flat surface portions extend substantially parallel with the center plane from perpendicular intersection portions where the radius of curvature intersects a perpendicular plane that passes the center portion and is perpendicular to the center plane; and said pair of inclined flat surface portions extend in tangential directions from first intersection portions where extensions of lines that join the contiguous portions and the center portion intersect said curved surface portion, and extend as far as second intersection portions where said parallel flat surface portions are intersected.

14. An electronic flash device according to claim 9, wherein said curved surface portion comprises an oval cylindrical surface portion produced by setting the center portion of the light source as a center of a radius of curvature;

wherein said pair of inclined flat surface portions extend in tangential directions from first intersection portions where extensions of lines that join the contiguous portions and the center portion intersect said cylindrical surface portion, and extend as far as second intersection portions where said parallel flat surface portions are intersected.

15. An electronic flash device comprising:

a light source; and a reflector that reflects light emitted from said light source on a reflective surface thereof, wherein said reflector includes:

a pair of first reflective surfaces that form part of a cylindrical curved surface and face one another; and a second reflective surface that is contiguous with said pair of first reflective surfaces and in an inside portion of which the light source is housed, and contiguous portions where said pair of first reflective surfaces and said second reflective surface are contiguous are set closer to an opening in said pair of first reflective surfaces than a center portion of the housed light source;

wherein said second reflective surface comprises:

a first curved surface portion produced by setting the center portion of the light source as a center of a radius of curvature;

a second curved surface portion that passes the contiguous portions and is obtained by displacing a center of a radius of curvature either closer to or further from the contiguous portions than the center portion of the light source; and a pair of inclined portions that are contiguous with both sides of said first curved surface portion, extend in tangential directions from first intersection portions where extensions of lines that join the contiguous portions and the center portion intersect said first curved surface portion, and extend as far as said second curved portion that intersects a perpendicular plane that passes the center portion and is perpendicular with a center plane about which said pair of first reflective surfaces are symmetrical.

16. An electronic flash device according to claim 15, wherein the center portion of the radius of curvature of said second curved surface portion is set at a point of intersection perpendicularly dropped to the center plane from the first intersection portions where extensions of lines that join the contiguous portions and the center portion intersect said first curved surface portion, or at a point of intersection near said point of intersection.

* * * * *